(12) United States Patent
Dow et al.

(10) Patent No.: US 9,060,184 B2
(45) Date of Patent: Jun. 16, 2015

(54) SYSTEMS AND METHODS FOR ADAPTIVE STREAMING WITH AUGMENTED VIDEO STREAM TRANSITIONS USING A MEDIA SERVER

(75) Inventors: Christopher Dow, San Francisco, CA (US); Alexander Ivanov, Tomsk (RU); Kourosh Soroushian, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 185 days.

(21) Appl. No.: 13/457,911

(22) Filed: Apr. 27, 2012

(65) Prior Publication Data

US 2013/0291031 A1    Oct. 31, 2013

(51) Int. Cl.
  *H04N 7/173* (2011.01)
  *H04N 21/2343* (2011.01)
  *H04N 21/643* (2011.01)
  *H04N 21/845* (2011.01)
  *H04N 21/854* (2011.01)

(52) U.S. Cl.
  CPC . *H04N 21/234327* (2013.01); *H04N 21/23439* (2013.01); *H04N 21/64322* (2013.01); *H04N 21/8451* (2013.01); *H04N 21/8456* (2013.01); *H04N 21/85406* (2013.01)

(58) Field of Classification Search
  None
  See application file for complete search history.

(56) References Cited

U.S. PATENT DOCUMENTS

| | | | |
|---|---|---|---|
| 5,966,162 A * | 10/1999 | Goode et al. | 725/90 |
| 6,678,332 B1 | 1/2004 | Gardere et al. | |
| 7,448,062 B1 | 11/2008 | Bloch et al. | |
| 2002/0087973 A1 * | 7/2002 | Hamilton et al. | 725/32 |
| 2004/0057412 A1 * | 3/2004 | Curcio et al. | 370/341 |
| 2006/0233259 A1 | 10/2006 | Chou et al. | |
| 2009/0328124 A1 * | 12/2009 | Khouzam et al. | 725/116 |
| 2010/0034254 A1 | 2/2010 | Wang | |
| 2010/0135637 A1 * | 6/2010 | McDermott et al. | 386/75 |
| 2011/0280153 A1 | 11/2011 | Li et al. | |
| 2012/0039582 A1 * | 2/2012 | Foo et al. | 386/241 |
| 2012/0042025 A1 | 2/2012 | Jamison et al. | |

(Continued)

FOREIGN PATENT DOCUMENTS

WO    2013163221 A1    10/2013

OTHER PUBLICATIONS

International Search Report and Written Opinion for International Application No. PCT/US2013/037851, International Filing Date: Apr. 23, 2013, Search Completed Aug. 26, 2013, Mailed Sep. 6, 2013, 13pgs.

(Continued)

*Primary Examiner* — Chenea Smith
(74) *Attorney, Agent, or Firm* — KPPB LLP

(57) ABSTRACT

Systems and methods for adaptive streaming with augmented video stream transitions using a media server in accordance with embodiments of the invention are disclosed. In one embodiment of the invention, a media server includes multimedia content including a set of alternative streams of video data and a processor, wherein the processor is configured to receive a request to stream multimedia content, stream a first stream of video data, where the first stream of video data is one of the set of alternative streams of video data contained in the multimedia content, receive a request for a second stream of video data, where the second stream of video data is one of the set of alternative streams of video data contained in the multimedia content, transmit an image in response to the request for the second stream of video data, and stream the second stream of video data.

21 Claims, 4 Drawing Sheets

(56) References Cited

U.S. PATENT DOCUMENTS

| | | |
|---|---|---|
| 2012/0207369 A1 | 8/2012 | Valadez et al. |
| 2012/0254456 A1* | 10/2012 | Visharam et al. ............. 709/231 |
| 2013/0279877 A1 | 10/2013 | Boak |
| 2013/0291031 A1 | 10/2013 | Dow et al. |

OTHER PUBLICATIONS

International Preliminary Report on Patentability for International Application PCT/US2013/037851, report completed Aug 26, 2013, Mailed Nov. 6, 2014, 12 Pgs.

* cited by examiner

SYSTEMS AND METHODS FOR ADAPTIVE STREAMING WITH AUGMENTED VIDEO STREAM TRANSITIONS USING A MEDIA SERVER

FIELD OF THE INVENTION

The present invention is directed, in general, to systems and methods for streaming data over a network and more specifically to systems and methods for streaming video data over a network utilizing adaptive streaming techniques.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Streaming video over the Internet has become a phenomenon in modern times. Many popular websites, such as YouTube, a service of Google, Inc. of Mountain View, Calif., and WatchESPN, a service of ESPN of Bristol, Conn., utilize streaming video in order to provide video and television programming to consumers via the Internet.

Scalable Video Coding (SVC) is an extension of the H.264/MPEG-4 AVC video compression standard, which is specified by the ITU-T H.264 standard by the International Telecommunication Union Telecommunication Standardization Sector of Geneva, Switzerland. SVC enables the encoding of a video bitstream that additionally contains one or more sub-bitstreams. The sub-bitstreams are derived from the video bitstream by dropping packets of data from the video bitstream, resulting in a sub-bitstream of lower quality and lower bandwidth than the original video bitstream. SVC supports three forms of scaling a video bitstream into sub-bitstreams: temporal scaling, spatial scaling, and quality scaling. Each of these scaling techniques can be used individually or combined depending on the specific video system.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

A digital image is a digital representation of an image. Digital images usually include a fixed number of pixels arranged in rows and columns in order to form a two-dimensional image. Digital images may exist as uncompressed bitmaps, or may be compressed using a variety of techniques and stored in a variety of formats, such as the Graphics Interchange Format (GIF), developed by CompuServe of Columbus, Ohio, the Joint Photographic Experts Group format (JPEG), developed by the Joint Photographic Experts Group of the International Organization for Standardization (ISO) and the International Electrotechnical Commission (IEC), both of Geneva, Switzerland, or the Portable Network Graphics (PNG) format, standardized as ISO/IEC 15948 by the ISO and IEC of Geneva, Switzerland. Other image compression techniques can be utilized as appropriate to the requirements of a specific application.

SUMMARY OF THE INVENTION

Systems and methods for adaptive streaming with augmented video stream transitions using a media server in accordance with embodiments of the invention are disclosed. In one embodiment of the invention, a media server includes multimedia content storage containing multimedia content including a set of alternative streams of video data and a processor, wherein the processor is configured to receive a request to stream multimedia content stored in the multimedia content storage, stream a first stream of video data, where the first stream of video data is one of the set of alternative streams of video data contained in the multimedia content, receive a request for a second stream of video data, where the second stream of video data is one of the set of alternative streams of video data contained in the multimedia content, transmit an image, where the image is transmitted in response to the request for the second stream of video data, and stream the second stream of video data.

In another embodiment of the invention, the first stream of video data includes a first group of pictures, where the first group of pictures includes a first frame and a last frame and the processor is configured to generate the transmitted image using the first group of pictures.

In an additional embodiment of the invention, the transmitted image is the last frame of the first group of pictures.

In yet another additional embodiment of the invention, the second stream of video data includes a second group of pictures, where the second group of pictures includes a first frame and a last frame and the processor is configured to generate the transmitted image using the second group of pictures.

In still another additional embodiment of the invention, the transmitted image is the first frame of the second group of pictures.

In yet still another additional embodiment of the invention, the processor is configured to generate the transmitted image in response to the request for the second stream of video data.

In yet another embodiment of the invention, the processor is configured to retrieve a pre-computed image to use as the transmitted image in response to the request for the second stream of video data.

In still another embodiment of the invention, the processor is configured to retrieve the pre-computed image from an image server.

In yet still another embodiment of the invention, the multimedia content is encoded using Scalable Video Coding.

In yet another additional embodiment of the invention, the multimedia content is stored in a Matroska container.

Still another embodiment of the invention includes augmented video transitions using a media server including multimedia content including receiving a request to stream multimedia content using a media server, where the multimedia content includes a set of alternative streams of video data, streaming a first stream of video data using the media server, where the first stream of video data is one of the set of alternative streams of video data, receiving a request for a second stream of video data using the media server, where the second stream of video data is one of the set of alternative streams of video data, transmitting an image to the network client using the media server, where the image is transmitted in response to the request for the second stream of video data, and streaming the second stream of video data using the media server.

In yet another additional embodiment of the invention, the first stream of video data includes a first group of pictures, where the first group of pictures includes a first frame and a last frame, and generating the image for display further includes using the first group of pictures to generate the image for display.

In still another additional embodiment of the invention, the transmitted image is the last frame of the first group of pictures.

In yet still another additional embodiment of the invention, the second stream of video data includes a second group of pictures, where the second group of pictures includes a first frame and a last frame, and generating the image for display further includes using the second group of pictures to generate the image for display.

In yet another embodiment of the invention, the transmitted image is the first frame of the second group of pictures.

In still another embodiment of the invention, augmented video stream transitions further include generating the transmitted image in response to the request for the second stream of video data.

In yet still another embodiment of the invention, augmented video stream transitions further include retrieving the transmitted image in response to the request for the second stream of video data.

In yet another additional embodiment of the invention, the transmitted image is retrieved from an image server.

In still another additional embodiment of the invention, the multimedia content is encoded using Scalable Video Coding.

In yet still another additional embodiment of the invention, the multimedia content is stored in a Matroska container.

Still another embodiment of the invention includes a machine readable medium containing processor instructions, where execution of the instructions by a processor causes the processor to perform a process including streaming a first stream of video data, receiving a request for a second stream of video data, transmitting an image, where the image is transmitted in response to the request for the second stream of video data, and streaming a second stream of video data.

DETAILED DESCRIPTION

Turning now to the drawings, systems and methods for adaptive streaming with augmented video stream transitions in accordance with embodiments of the invention are disclosed. Adaptive streaming systems are configured to stream multimedia content encoded at different maximum bitrates and resolutions over a network, such as the Internet. Adaptive streaming systems stream the highest quality multimedia content which can be supported based upon current streaming conditions. Multimedia content typically includes video and audio data, subtitles, and other related metadata. In order to provide the highest quality video experience independent of the network data rate, adaptive bitrate streaming systems are configured to switch between the available sources of video data throughout the delivery of the video data according to a variety of factors, including, but not limited to, the available network data rate and video decoder performance. When streaming conditions deteriorate, an adaptive bitrate streaming system typically attempts to switch to multimedia stream(s) encoded at lower maximum bitrates. In the event that the available network data rate cannot support streaming of the stream(s) encoded at the lowest maximum bitrate, then playback is often disrupted until a sufficient amount of content can be buffered to restart playback. When displaying a video stream, adaptive bitrate streaming systems often initialize a video decoder in order to decode and display the video stream. The process of initializing a video decoder may result in unwanted visual disturbances (particularly on resource constrained devices). Adaptive bitrate streaming systems in accordance with embodiments of the invention can utilize augmented video stream transitions to display an image when switching between video streams in order to obscure any visual disruptions and provide an improved user experience. Systems and methods for switching between video streams during playback that can be adapted to include augmented video stream transitions in accordance with embodiments of the invention are described in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety. A variety of methods may be utilized in accordance with embodiments of the invention in order to generate the image displayed during video stream transitions, such as retrieving the image from a media server or capturing the currently displayed image on a network client. Systems and methods for adaptive bitrate streaming with augmented video stream transitions in accordance with embodiments of the invention are discussed further below.

System Overview

Figure 1:
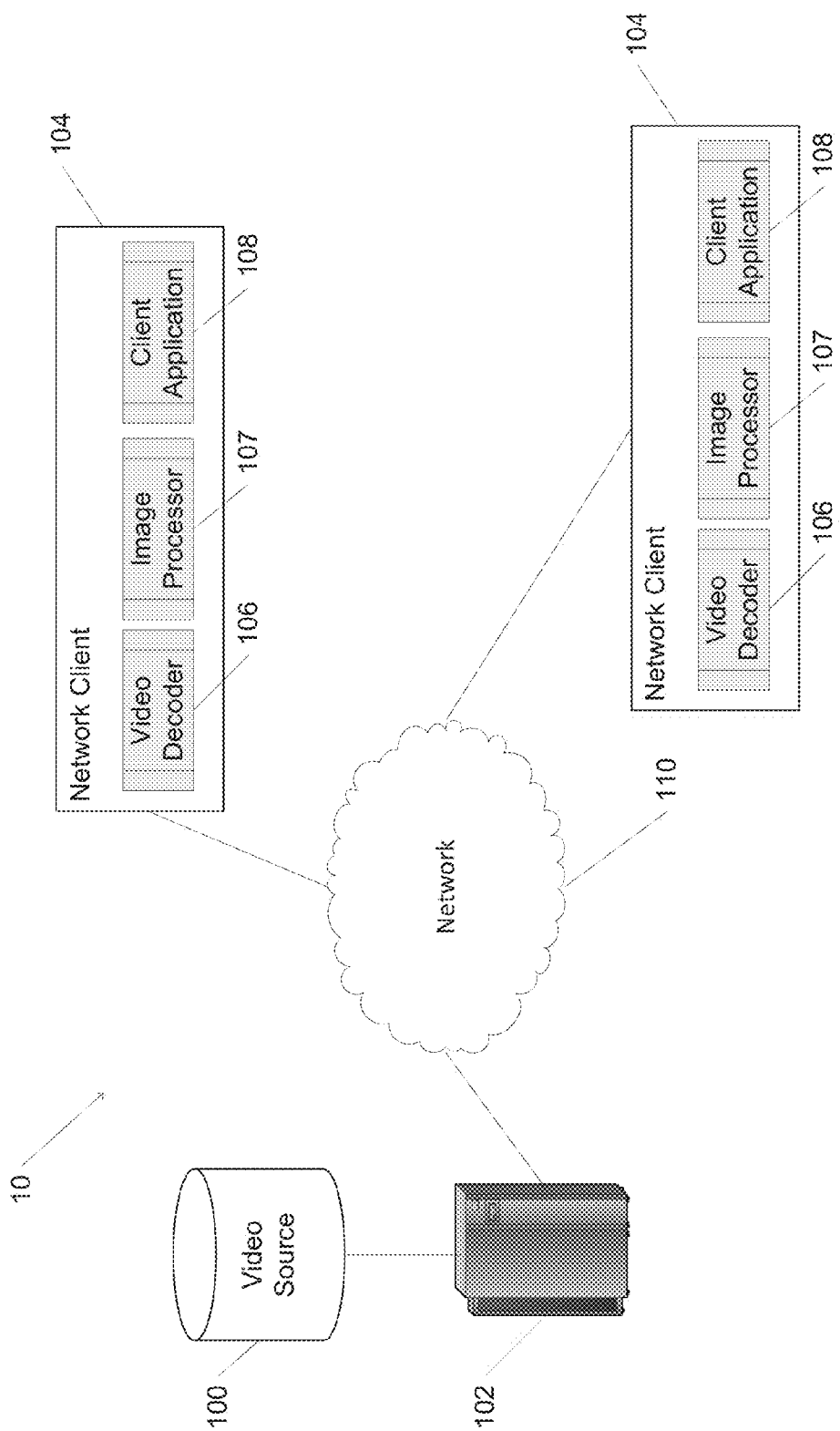
FIG. 1 is a system diagram of a system for streaming video data in accordance with an embodiment of the invention.

Video data networks in accordance with embodiments of the invention are configured to adapt the bitrate of the video transmitted to network clients based on streaming conditions. A video data network in accordance with an embodiment of the invention is illustrated in FIG. 1. The illustrated video data network 10 includes a video source 100. In a number of embodiments of the invention, the video source 100 contains pre-encoded video data encoded at multiple bitrates and resolutions for adaptive bitrate streaming. In several embodiments of the invention, the video source encodes video data in real time. In many embodiments of the invention, the video source contains video data encoded utilizing Scalable Video Coding (SVC). In a number of embodiments, the video source contains multiple streams with equal timelines as video data. The video source 100 is connected to a network renderer 102. In many embodiments, the video source 100 and the network renderer 102 are implemented using a media server. The network renderer 102 is connected to a plurality of network clients 104 via a network 110. The network renderer 102 is configured to stream video data to one or more network clients 104.

In many embodiments of the invention, the network renderer 102 is implemented using a single machine. In several embodiments of the invention, the network renderer is implemented using a plurality of machines. In many embodiments of the invention, the network renderer and the video source are implemented using a media server. In many embodiments, the network 110 is the Internet. In several embodiments, the network 110 is any IP network. In a number of embodiments, the network 110 is a cellular data network.

The network clients 104 each contain a video decoder 106, an image processor 107, and a client application 108. Network clients 104 are configured to decode video streams using the video decoder 106 and to display images using the image processor 107. In many embodiments, the network clients 104 are configured to switch between video streams based on a variety of factors, including the performance of the network connection and the performance of the video decoder 106. In several embodiments, switching between video streams causes visual disturbances. In a number of embodiments, the network clients 104 are configured to retrieve an image from the network renderer 102 and display the retrieved image using the image processor 107 while switching between video streams. In several embodiments, the network clients 104 are configured to retrieve an image from the video decoder 106 and display the retrieved image using the image processor 107 while switching between video streams. In many embodiments, the client application 108 is configured to control the creation and termination of the video decoder 106 and/or the image processor 107. In several embodiments, the client application controls the playback of video streams using the video decoder 106 and/or the image processor 107. In a number of embodiments, the client application 108 controls the display of an image between the last frame of a first stream of video played back by the network client and the first frame of a second video stream played back by the network client.

Figure 2:
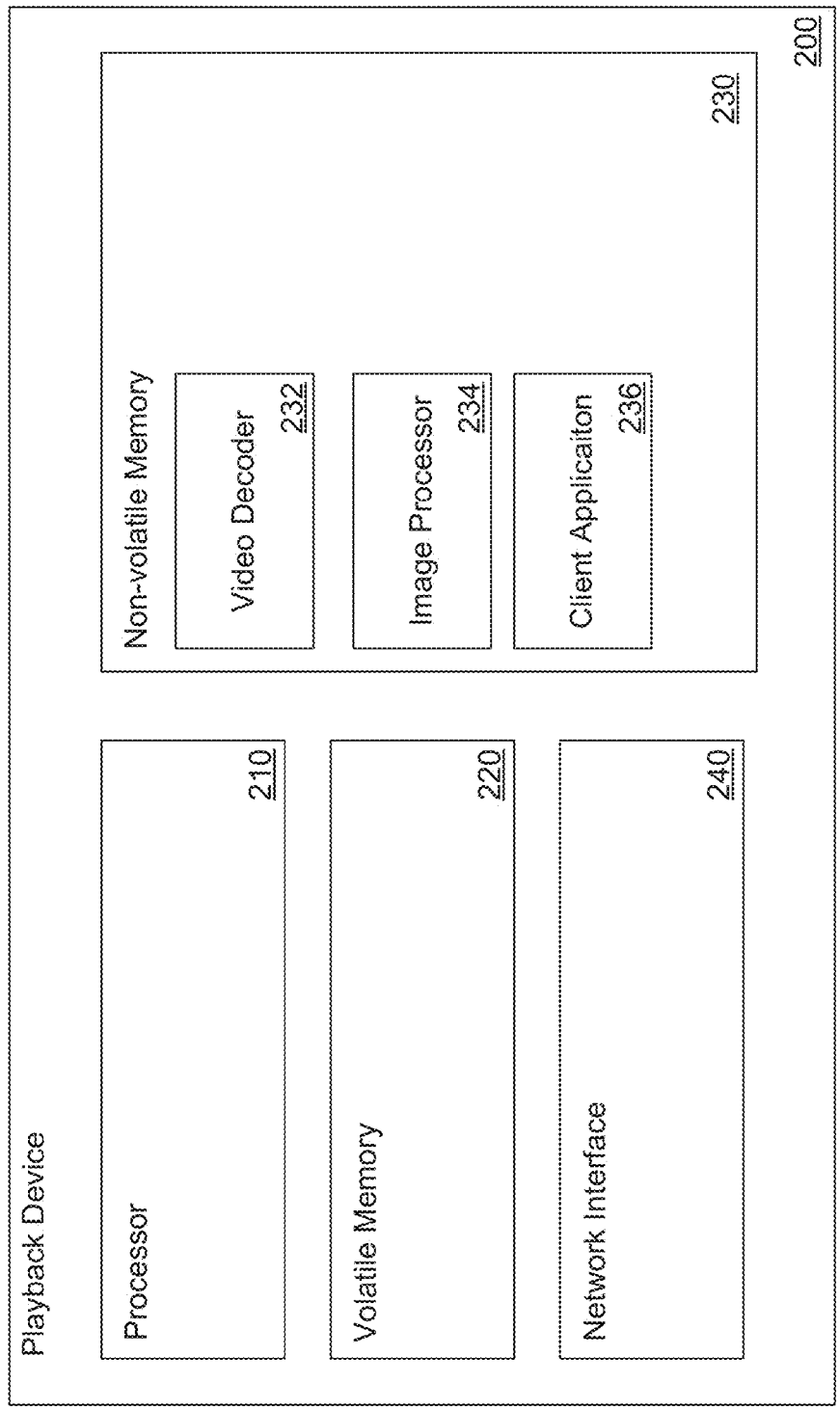
FIG. 2 conceptually illustrates a network client configured to perform dynamic video scaling in accordance with an embodiment of the invention.

In many embodiments of the invention, network clients can include consumer electronics devices such as DVD players, Blu-ray players, televisions, set top boxes, video game consoles, tablets, and other devices that are capable of connecting to a server and playing back encoded media. The basic architecture of a network client in accordance with an embodiment of the invention is illustrated in FIG. 2. The network client 200 includes a processor 210 in communication with non-volatile memory 230 and volatile memory 220. In the illustrated embodiment, the non-volatile memory includes a video decoder 232 that configures the processor to decode scalable video data, an image processor 234 which is configured to display images, and a client application 236 configured to create, operate, and terminate the video decoder 232 and/or the image processor 234. In many embodiments of the invention, the image processor 234 is configured to decoded encoded images for display. In several embodiments, the video decoder 232, the image processor 234, and/or the client application 236 are implemented using the processor 210. The network client 200 also includes a network interface 240 configured to send and receive data over a network connection. In a number of embodiments, the network interface 240 is in communication with the processor 210, the non-volatile memory 230, and the volatile memory 220.

In many embodiments of the invention, the network client 200 includes multiple processors. In several embodiments, the video decoder 232, the image processor 234, and/or the client application 236 are utilize separate processors. In a number of embodiments, the video decoder 232, the image processor 234, and/or the client application 236 are implemented using dedicated hardware. Although a specific network client architecture is illustrated in FIG. 2, any of a variety of architectures including architectures where the video decoder is located on disk or some other form of storage and is loaded into volatile memory at runtime can be utilized to implement network clients for use in adaptive video data streaming systems with augmented video transitions in accordance with embodiments of the invention.

Although a specific architecture of a video data network is shown in FIG. 1, other implementations appropriate to a specific application can be utilized in accordance with embodiments of the invention. Processes for streaming video data with augmented video stream transitions in accordance with embodiments of the invention are discussed further below.

Server-Based Augmented Video Stream Transitions

Figure 3:
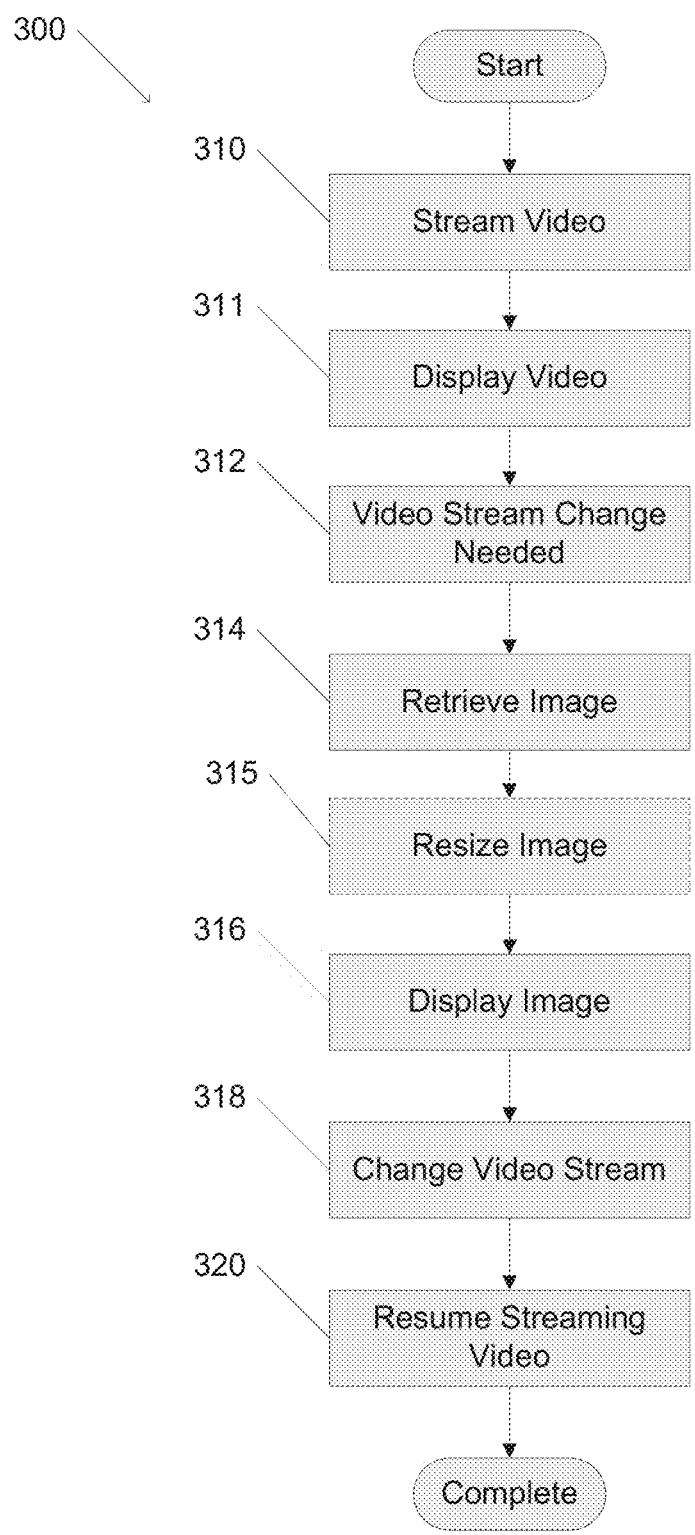
FIG. 3 is a flow chart illustrating a process for server-based augmented video stream transitions in accordance with an embodiment of the invention.

While playing back streamed video data, network clients often switch between video streams based on network conditions or video decoder performance in order to ensure smooth video playback. However, many network clients experience delays or visual disturbances when transitioning between video streams, such as when the video decoder is initialized in order to display the new video stream or when the network data rate drops to a point where the throughput of the network is insufficient to support streaming video data and the system buffers data sufficient to resume playback of the video stream. A process for sever-based augmented video stream transitions for use in adaptive streaming systems with augmented video stream transitions in accordance with an embodiment of the invention is illustrated in FIG. 3. The process 300 includes streaming (310) video. In many embodiments, the video is streamed (310) between a media server and a network client. The video is displayed (311). When a determination is made that a video stream change is needed (312), the process initiates a stream transition. In a number of embodiments, the video stream transition is based on network conditions and/or the performance of the network client. The network client retrieves (314) an image from the media server. In several embodiments, the image retrieved (314) corresponds to the first frame of a group of pictures. In many embodiments, the image retrieved (314) corresponds to the last frame of a group of pictures. In several embodiments, the image retrieved (314) corresponds to the last frame of video displayed (311) to the network client. In a number of embodiments, the image retrieved (314) is created by the media server at the time the image is retrieved. In many embodiments, the image retrieved (314) is pre-computed and stored on the media server. In a number of embodiments, the image retrieved (314) is retrieved from a separate image server. In several embodiments, the image retrieved (314) has been created according to the resolution of the streaming video (310). In a number of embodiments, the image retrieved (314) has been created according to the highest resolution of the adaptive stream videos.

In several embodiments, the network client resizes (315) the image. In many embodiments, the image is resized (315) such that it matches the resolution of the last video frame. In a number of embodiments, the image is resized (315) such that it matches the resolution of the first video frame of the next group of frames. The network client displays (316) the image. In a number of embodiments, the network client displays (316) the image using an image processor. As the image is displayed, the network client (318) prepares to receive media from a second video stream. In a number of embodiments, the second video stream is at a different resolution than the first video stream. In several embodiments, changing (318) the video stream involves initializing a video decoder. Initializing a video decoder can create visual disturbances, such as displaying video artifacts or resetting a display device. In several embodiments, visual disturbances are avoided by displaying an image using an image processor. The network client resumes (320) streaming video and stops displaying the image. In a number of embodiments, by displaying an image while changing to the second video stream, any visual artifacts caused by changing video streams are not displayed on the network client.

Although a specific method for server-based augmented video stream transitions for use in adaptive streaming systems with augmented video stream transitions is illustrated in FIG. 3, other implementations can be utilized in accordance with embodiments of the invention. Processes for client-based augmented video stream transitions for use in adaptive streaming systems with augmented video stream transitions in accordance with embodiments of the invention are discussed further below.

Client-Based Augmented Video Stream Transitions

Figure 4:
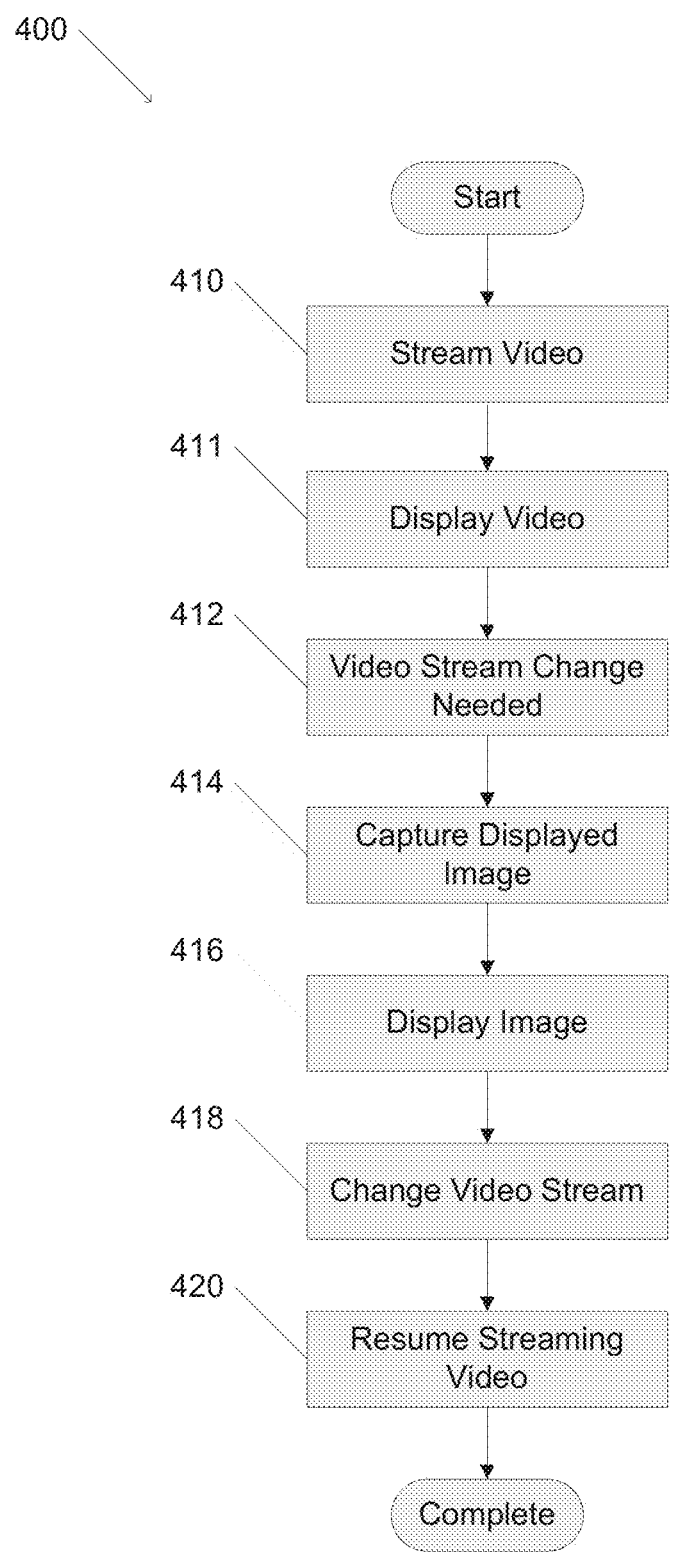
FIG. 4 is a flow chart illustrating a process for client-based augmented video stream transitions in accordance with an embodiment of the invention.

While playing back streamed video data, network clients often switch between video streams based on network conditions or video decoder performance in order to ensure smooth video playback. While switching between video streams, augmented video stream transitions may be implemented using the network client. A process for client-based augmented video stream transitions for use in adaptive streaming systems in accordance with an embodiment of the invention is illustrated in FIG. 4. The process 400 includes streaming (410) video. In many embodiments, the video is streamed (410) between a media server and a network client. The video is displayed (411). When a determination is made that a video stream change is needed (412), the processes initiates a stream transition. In a number of embodiments, the video stream change is based on network conditions and/or the performance of the network client. In several embodiments, a network client may be unable to retrieve an image from a media server for a variety of reasons, including network conditions and/or the performance of the network client. Therefore, the network client captures (414) an image. In several embodiments, the network client always captures an image irrespective of whether the network conditions would support downloading of a pre-generated image from a remote server. In many embodiments, the captured (414) image is the image currently being displayed (411) by the network client. In several embodiments, the image is captured (414) directly from a display buffer. In many embodiments, the captured (414) image is uncompressed. In several embodiments, the captured (414) image is compressed using an image compression technique, such as (but not limited to) the Graphics Interchange Format (GIF), the Joint Photographic Experts Group (JPEG) format, or the Portable Network Graphics (PNG) format. In a number of embodiments, the image (414) corresponds to a frame in the received streamed video data. In many embodiments, the captured (414) image is the first frame of a group of pictures. In several embodiments, the captured (414) image is the last frame of a group of pictures.

The network client displays (416) the image. In a number of embodiments, the network client displays (416) the image using an image processor. In many embodiments, an image processor is implemented using a processor configured to display images in a specified format. The network client changes (418) to a second video stream. In a number of embodiments, the second video stream is at a different resolution than the first video stream. In several embodiments, changing (418) the video stream involves initializing a video decoder. In many embodiments, initializing a video decoder creates visual disturbances, such as displaying video artifacts or resetting a display device. In several embodiments, visual disturbances caused by the video decoder do not affect the display of an image using an image processor. The network client resumes (420) streaming video. In a number of embodiments, by displaying an image while changing to the second video stream, any visual artifacts that would otherwise be displayed when changing between video streams are not displayed on the network client. A specific method for client-based augmented video stream transitions for use in adaptive streaming systems with augmented video stream transitions is illustrated in FIG. 4; however, other implementations can be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. A media server, comprising:
multimedia content storage containing multimedia content comprising a set of alternative streams of video data; and
a processor;
wherein the processor is configured to:
receive a request to stream multimedia content stored in the multimedia content storage from a network client;
stream a first stream of video data to the network client, where the first stream of video data is one of the set of alternative streams of video data contained in the multimedia content and is encoded at a first maximum bitrate and a first resolution;
receive a request for a second stream of video data from the network client, where the second stream of video data is one of the set of alternative streams of video data contained in the multimedia content and is encoded at a second maximum bitrate and a second resolution that are different than the first maximum bitrate and the first resolution;
transmit an image configured to be displayed by an image processor of the network client during initialization of a video decoder to decode the second stream of video data at the second maximum bitrate and the second resolution, where:
the image is transmitted to the network client in response to the request for the second stream of video data,
the image has a third resolution that is different than the first and the second resolution, and
the image is resized by the image processor prior to display such that the resized image matches the second resolution; and
after transmission of the image, stream the second stream of video data to the network client.

2. The media server of claim 1, wherein:
the first stream of video data comprises a first group of pictures, where the first group of pictures comprises a first frame and a last frame; and
the processor is configured to generate the transmitted image using the first group of pictures.

3. The media server of claim 2, wherein the transmitted image is the last frame of the first group of pictures.

4. The media server of claim 1, wherein:
the second stream of video data comprises a second group of pictures, where the second group of pictures comprises a first frame and a last frame; and
the processor is configured to generate the transmitted image using the second group of pictures.

5. The media server of claim 4, wherein the transmitted image is the first frame of the second group of pictures.

6. The media server of claim 1, wherein the processor is configured to generate the transmitted image in response to the request for the second stream of video data.

7. The media server of claim 1, wherein the processor is configured to retrieve a pre-computed image to use as the transmitted image in response to the request for the second stream of video data.

8. The media server of claim 7, wherein the processor is configured to retrieve the pre-computed image from an image server.

9. The media server of claim 1, wherein the multimedia content is encoded using Scalable Video Coding.

10. The media server of claim 1, wherein the multimedia content is stored in a Matroska container.

11. A method for augmented video transitions using a media server comprising multimedia content, comprising:
receiving a request to stream multimedia content using a media server, where the multimedia content comprises a set of alternative streams of video data and where the request is received from a network client;
streaming a first stream of video data to the network client using the media server, where the first stream of video data is one of the set of alternative streams of video data and is encoded at a first maximum bitrate and a first resolution;
receiving a request for a second stream of video data from the network client using the media server, where the second stream of video data is one of the set of alternative streams of video data and is encoded at a second maximum bitrate and a second resolution that are different than the first maximum bitrate and the first resolution;
transmitting an image to the network client using the media server, where the image is configured to be displayed by an image processor of the network client during initialization of a video decoder to decode the second stream of video data at the second maximum bitrate and the second resolution, and where:
the image is transmitted to the network client in response to the request for the second stream of video data,
the image has a third resolution that is different than the first and the second resolution, and
the image is resized by the image processor prior to display such that the resized image matches the second resolution; and
after transmission of the image, streaming the second stream of video data to the network client using the media server.

12. The method of claim 11, wherein:
the first stream of video data includes a first group of pictures, where the first group of pictures comprises a first frame and a last frame; and
generating the image for display further comprises using the first group of pictures to generate the image for display.

13. The method of claim 12, wherein the transmitted image is the last frame of the first group of pictures.

14. The method of claim 11, wherein:
the second stream of video data includes a second group of pictures, where the second group of pictures comprises a first frame and a last frame; and
generating the image for display further comprises using the second group of pictures to generate the image for display.

15. The method of claim 14, wherein the transmitted image is the first frame of the second group of pictures.

16. The method of claim 11, further comprising generating the transmitted image in response to the request for the second stream of video data.

17. The method of claim 11, further comprising retrieving the transmitted image in response to the request for the second stream of video data.

18. The method of claim 17, wherein the transmitted image is retrieved from an image server.

19. The method of claim 11, wherein the multimedia content is encoded using Scalable Video Coding.

20. The method of claim 11, wherein the multimedia content is stored in a Matroska container.

21. A non-transitory machine readable medium containing processor instructions, where execution of the instructions by a processor causes the processor to perform a process comprising:
receiving a request to stream multimedia content stored in a multimedia content storage from a network client;
streaming a first stream of video data to the network client where the first stream of video data is one of the set of alternative streams of video data contained in the multimedia content and is encoded at a first maximum bitrate and a first resolution;
receiving a request for a second stream of video data from the network client, where the second stream of video data is one of the set of alternative streams of video data contained in the multimedia content and is encoded at a second maximum bitrate and a second resolution that are different than the first maximum bitrate and the first resolution;
transmitting an image configured to be displayed by an image processor of the network client during initialization of a video decoder to decode the second stream of video data at the second maximum bitrate and the second resolution where, where:
the image is transmitted to the network client in response to the request for the second stream of video data,
the image has a third resolution that is different than the first and the second resolution, and
the image is resized by the image processor prior to display such that the resized image matches the second resolution; and
after transmission of the image, streaming a second stream of video data to the network client.

* * * * *